United States Patent
Ryan et al.

(10) Patent No.: US 7,085,630 B2
(45) Date of Patent: Aug. 1, 2006

(54) METHOD AND APPARATUS FOR PREDICTING RUNWAY OVERRUN

(75) Inventors: Dean E. Ryan, Dublin, OH (US); William C. Brodegard, Delaware, OH (US)

(73) Assignee: Avidyne Corporation, Lincoln, MA (US)

( * ) Notice: Subject to any disclaimer, the term of this patent is extended or adjusted under 35 U.S.C. 154(b) by 0 days.

(21) Appl. No.: 11/192,278

(22) Filed: Jul. 29, 2005

(65) Prior Publication Data

US 2005/0261814 A1 Nov. 24, 2005

Related U.S. Application Data

(62) Division of application No. 10/972,328, filed on Oct. 26, 2004, which is a division of application No. 10/442,147, filed on May 21, 2003.

(60) Provisional application No. 60/448,906, filed on Feb. 24, 2003.

(51) Int. Cl.
*G06F 19/00* (2006.01)

(52) U.S. Cl. ............................................. 701/16

(58) Field of Classification Search ............... None
See application file for complete search history.

(56) References Cited

U.S. PATENT DOCUMENTS

| | | | | |
|---|---|---|---|---|
| 4,043,194 A | * | 8/1977 | Tanner .................. 73/178 T |
| 4,122,522 A | * | 10/1978 | Smith ..................... 701/15 |
| 4,368,517 A | * | 1/1983 | Lovering ................ 701/16 |
| 4,454,582 A | * | 6/1984 | Cleary et al. ............ 701/15 |
| 4,638,437 A | * | 1/1987 | Cleary et al. ............ 701/15 |
| 5,968,106 A | * | 10/1999 | DeVlieg et al. .......... 701/70 |
| 6,720,891 B1 | * | 4/2004 | Chen et al. ............ 340/969 |

* cited by examiner

*Primary Examiner*—Michael J. Zanelli
(74) *Attorney, Agent, or Firm*—Connolly, Bove, Lodge & Hutz; Stanley R. Green

(57) ABSTRACT

A critical point on a runway indicates a point at which an aircraft may experience a runway overrun if landing beyond the critical point. A path projection is extended from the aircraft at a descent slope angle to determine whether the aircraft will land beyond the critical point at the current descent slope. Timely alerts may be provided by accounting for the time required to announce a distance value, and the distance traveled during the announcement.

11 Claims, 5 Drawing Sheets

METHOD AND APPARATUS FOR PREDICTING RUNWAY OVERRUN

RELATED APPLICATION

This application claims priority to the provisional application assigned U.S. Application Ser. No. 60/448,906, filed in the United States Patent and Trademark Office on Feb. 24, 2003, and entitled "RUNWAY OVERRUN MONITOR AND METHOD FOR MONITORING RUNWAY OVERRUNS."

BACKGROUND

1. Technical Field

The invention relates to aircraft safety equipment and more particularly to an apparatus and method for increasing flight crew situational awareness during landing.

2. Related Art

Landing is one of the most demanding tasks in flying. During the landing process, the aircraft must be brought to a safe and complete stop. To perform the landing properly, the aircraft must approach the runway within certain attitude, track, speed, and rate of descent limits. An approach outside of these limits can result in a "hard" landing, overrunning the runway end, or otherwise contacting the runway surface in an uncontrolled manner. Any one of these events has the potential to cause severe damage to the aircraft and may additionally result in passenger injuries or fatalities.

Landing too fast and landing too far down a runway may contribute to runway overrun accidents. Pilots are trained to monitor these conditions during the approach, and to initiate a go-around maneuver if a safe landing is not assured. The effectiveness of pilot training depends, however, on the skill and judgment of the pilot in recognizing a possible runway overrun condition, and in executing the appropriate response. Pilots with varying levels of skill are therefore likely to respond differently to the same scenario.

In most landing and departure situations, the pilot's vision is the sole data source for estimating runway position information. Even with existing high standards for pilot eyesight, some variation in acuity will occur as the pilot's physical condition, alertness, and state of rest vary. If the pilot's vision is the sole source of data used to determine whether a go-around or aborted takeoff is necessary, then variations in visual acuity, distractions or poor visibility may reduce the quality of the data used in the pilot's decision. In addition, a pilot may fly for years without experiencing a runway overrun, and the pilot may be slow to recognize a problem during landing.

Aircraft safety can be improved by mitigating the effects of differing pilot skill levels and situational awareness during the landing phase of flight.

SUMMARY

According to a first aspect, a method of providing situational awareness during landing of an aircraft comprises determining a critical point on a runway, the critical point indicating a point at which if the aircraft lands beyond the critical point, there is a likelihood of the aircraft overrunning the runway. If a path projection from the aircraft intersects the runway beyond the critical point, an alert is provided.

According to a second aspect, a method of providing timely alert messages in an aircraft during landing comprises determining message data regarding the aircraft's status during a landing phase, determining aircraft speed, adjusting a message based on the message data according to aircraft speed, and announcing the adjusted message.

According to a third aspect, a method for monitoring for runway overrun when an aircraft is landing on a runway comprises determining an aircraft's position on the runway after the aircraft has touched down, determining the aircraft's groundspeed, determining the aircraft's deceleration, calculating a runway distance remaining before the aircraft on the runway, calculating a distance required to reach a desired speed at said deceleration, and generating an alert if the required distance is greater than the remaining runway distance.

Those skilled in the art will appreciate the above stated advantages and other advantages and benefits of various embodiments of the invention upon reading the following detailed description of the embodiments with reference to the below-listed drawings.

According to common practice, the various features of the drawings are not necessarily drawn to scale. Dimensions of various features may be expanded or reduced to more clearly illustrate the embodiments of the invention.

BRIEF DESCRIPTION OF THE FIGURES

The present invention is described with reference to the accompanying drawings. In the drawings, like reference numbers indicate identical or functionally similar elements.

DETAILED DESCRIPTION

A runway overrun monitor provides an aircraft crew with a source of reliable and accurate data during the landing phase. Available information includes, for example, messages notifying the crew that under current conditions, the aircraft will not have enough runway to land safely. Information can also include alerts that the aircraft will exceed a maximum touchdown speed, or that maximum tailwind or crosswind limits will be exceeded. The above alerts can be provided automatically by the runway overrun monitor.

To minimize cockpit confusion during landing, the runway overrun monitor may be configured to omit unsolicited, routine information. The pilot or crew may, however, solicit information such as, for example, tailwind and crosswind component values, runway identification, runway remaining for landing, and speed over the ground.

Figure 1:
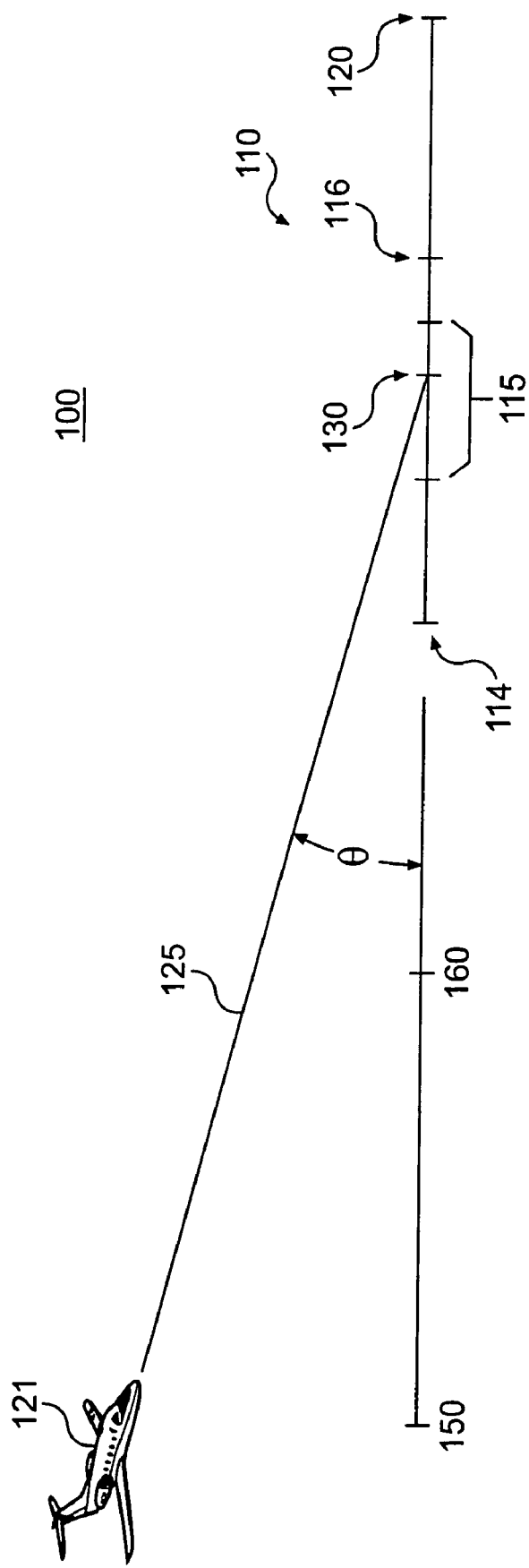
FIG. 1 is a schematic side elevational view of a runway landing environment.

FIG. 1 illustrates a runway environment 100. The runway environment 100 is illustrated as including a runway 110, a runway start 114, a touchdown zone (TDZ) 115, a critical point 116, an aircraft path projection 125, a touchdown aim point 130, and a first checkpoint 150. The touchdown zone 115 is the length of the runway 110 where aircraft customarily touch down on landing. A common TDZ length is 75 feet, beginning at 500 feet past the runway start 114. TDZ lengths and locations on runways vary, however.

During the landing phase, an aircraft 121 descends along the path projection 125 to touch down at the touchdown aim point 130. The touchdown aim point 130 is the location of the intersection of the path projection 125 with the runway 110. The pilot then uses the aircraft brakes and reverse engine thrust, if available, to slow the aircraft 121 to a safe speed. As the aircraft approaches touchdown, the touchdown aim point may vary along the runway 110. Thus, the touchdown aim point 130 is a predictor of the position along the runway 110 at which the aircraft 121 will actually touch down. Once the aircraft 121 touches down, the distance between the actual touchdown point and the runway end 120 is the available runway for slowing the aircraft 121 before it overruns the runway 110. This distance between the predictor touchdown point 130 and the runway 120 may be referred to as "runway remaining" as the aircraft 121 approaches touchdown. As discussed below, calculations for runway distance remaining may be adjusted according to landing flare. A runway overrun can be generally defined as a situation in which the aircraft 121 proceeds past the runway end 120 at a groundspeed too high for safely attempting to turn the aircraft 121 onto a taxiway.

According to one aspect of the invention, the path projection 125 of the aircraft 121 is monitored to determine whether the touchdown aim point 130 is either in front of or beyond the critical point 116. The critical point 116 may be defined as indicating a point at which if the aircraft lands beyond the critical point 116, there is a likelihood of the aircraft overrunning the runway 110. Alerts are provided if the touchdown aim point 130 is beyond the critical point 116.

Figure 2:
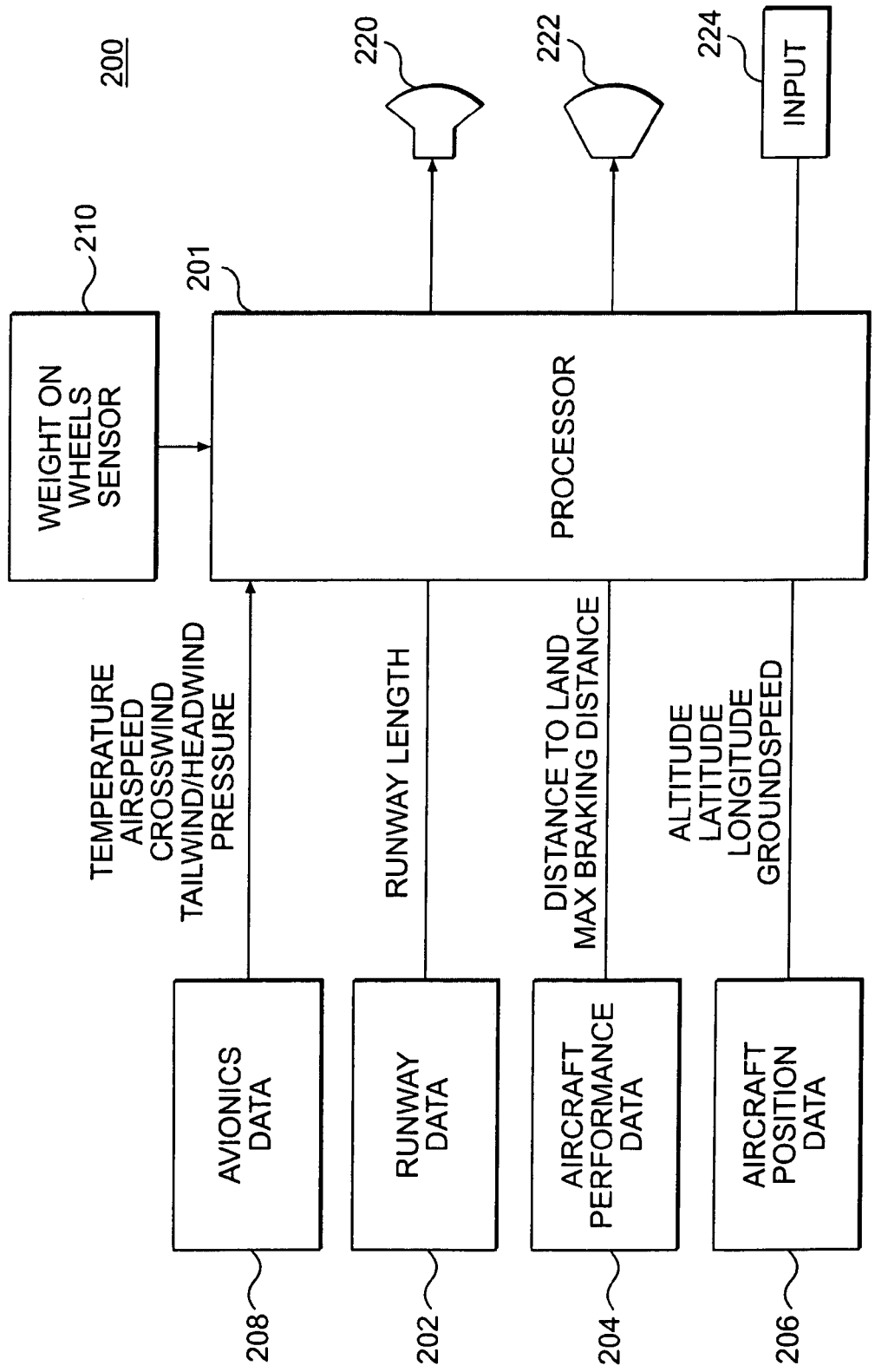
FIG. 2 is a block diagram of a first embodiment of a runway overrun monitor.

FIG. 2 illustrates a runway overrun monitor 200 capable of performing the alert functions described above. The runway overrun monitor 200 functions to apprise the pilot or crew members of the status of the aircraft carrying the monitor 200. The runway overrun monitor 200 comprises a data processor 201 coupled to a source 202 of company or manufacturer supplied runway data, a source 204 of aircraft performance data, a source 206 of aircraft position data, and a source 208 of avionics data. The data processor 201 may also be coupled to alert devices such as an audio indicator 220 and a visual indicator 222. The audio indicator 220 can be, for example, a speaker, or a source of audio input coupled to headphones worn by a pilot. The visual indicator 222 can be, for example, one or more colored lights on a panel, or a display screen such as an LCD or CRT monitor. A weight on wheels (WOW) sensor 210 may be coupled to the processor 201 to provide an indication as to when the aircraft is airborne.

The data processor 201 may be coupled to an input device 224. The input device 224 may be used to solicit information from the monitor 200. The input device 224 may also be used at any time to request a data update from the runway overrun monitor 200. The input device 224 may include, for example, a "request update" button, or one or more keys designated for this purpose. Allowing the pilot or other operator to request specific updates reduces unnecessary background noise in the cockpit, while ensuring that the pilot receives alert information without looking inside the cockpit and away from the runway. In a preferred embodiment, the monitor 200 can include a single button that can be used to request information, and to mute further alerts. The input device 224 can therefore be used to acknowledge an alert. In a preferred embodiment, alerts are given only once, however, and acknowledgement of alerts is not necessary.

The runway data from the source 202 describes the state of the runway that the aircraft carrying the runway overrun monitor 200 is preparing to land on or take off from. The runway data may include, for example, the length, and gradient of the intended landing runway. The runway data may also include a map of the airport, which includes data defining the runways at the airport, including the runway identifications. The runway data can be used to compare aircraft position with the distance to any of the runway boundaries, including the aircraft's height above ground in relation to a runway environment. Runway data can be taken from, for example, an airport mapping database (AMDB) including a digital description of the airport geography, such as the location of runways and a description of the altitude of the runways.

The aircraft performance data from the source 204 may include, for example, company policy limits with respect to landing and stopping distance characteristics of an aircraft as a function of, for example, aircraft weight, with corrections based on, for example, wind direction, runway slope, runway surface condition, atmospheric altitude and outside temperature. The aircraft performance data may also include a list of manufacturer or company regulations defining various aspects of flight. For example, a company regulation may define maximum permissible airspeeds, groundspeeds, descent angles, minimum runway, required gear and flap configurations, etc., for different stages of landing.

In a preferred embodiment, the aircraft operator (the chief pilot, for example) can input a general required landing distance for the aircraft. The general required landing distance may be altered by the processor 201 according to factors such as, for example, the presence of a tailwind component, altitude, runway gradient, and air temperature. Additional aircraft performance data is therefore not required.

The aircraft position data from the source 206 may include, for example, aircraft altitude, latitude, longitude, track over the ground, descent slope and groundspeed. The position data can be used to calculate the aircraft's vertical and horizontal acceleration. The monitor 200 may be coupled to one or more of an inertial navigation system, an altimeter, a global positioning system receiver, and an accelerometer to obtain aircraft position data. Position data can be differentiated with respect to time to obtain velocity, including groundspeed, and acceleration data. The position data can be in the form of, for example, longitude, latitude and altitude. Velocity may also be provided directly from the global positioning system, or from the inertial navigation system.

The avionics (more specifically, air data and heading) data from the source 208 can include, for example, data such as pressure, airspeed, true airspeed and wind vector (wind vector may be estimated using the true airspeed, groundspeed, track and heading) and direction, which may be provided as tailwind/headwind components, may also be supplied to the monitor 200. The monitor 200 may use this data to determine, for example, tailwind and crosswind components.

Figure 3:
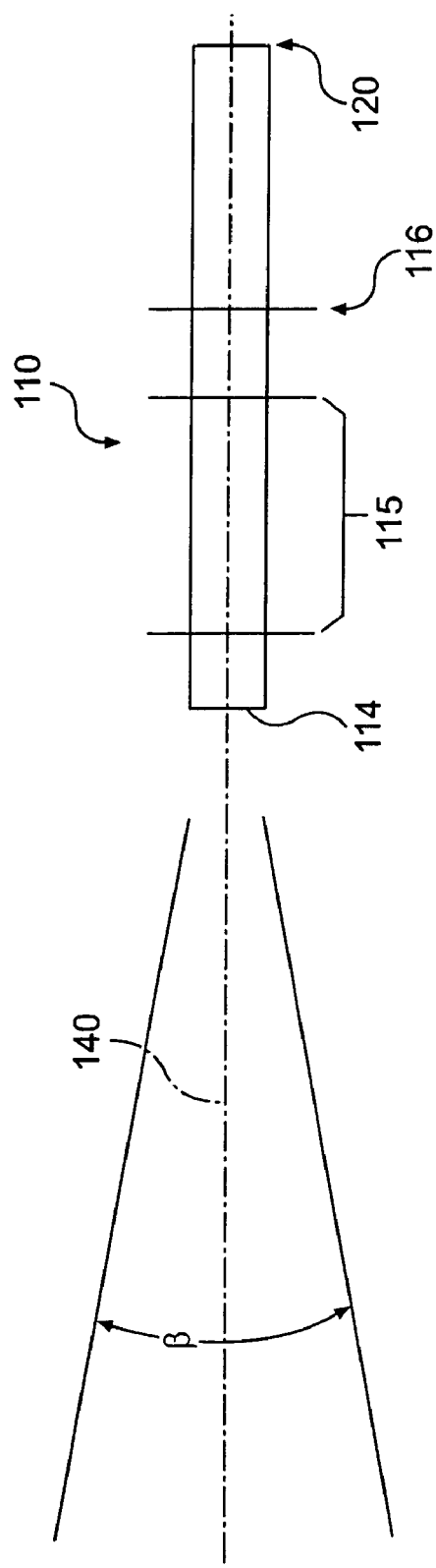
FIG. 3 is a top plan view of a portion of the runway landing environment illustrated in FIG. 1.
Figure 4:
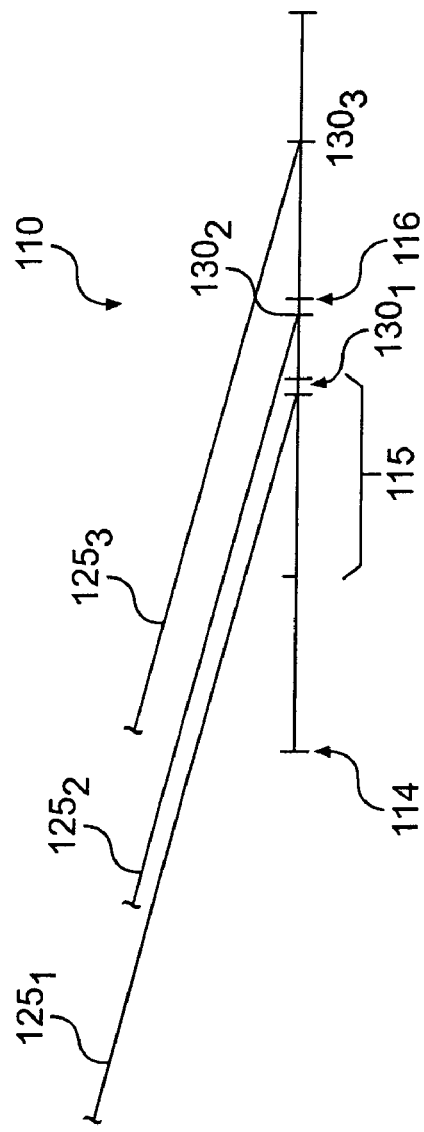
FIG. 4 is a schematic side elevational view of a portion of the runway landing environment illustrated in FIG. 1, including several descent slopes.

FIGS. 1, 3 and 4 illustrate an embodiment of a method for providing situational awareness during landing.

Referring to FIG. 1, the aircraft 121 is illustrated as approaching the runway 110. The point 150 illustrates a first checkpoint, and can serve as a starting point at which the runway overrun monitor 200 begins monitoring the aircraft's situation during landing. As an alternative, monitoring may begin when the visual path point 125 intersects with the touch down zone 115. FIG. 3 is a top plan view of the runway 110.

According to conventional landing procedures, an aircraft follows a descent slope during landing. The descent slope is typically defined as some optimal angle of descent for the aircraft. For example, descent slopes may be inclined at an angle in the range of about 3–4°. Maximum (i.e., steepest) descent slope values for the aircraft 121 may be provided by, for example, the aircraft operator, such as the owning corporation of the aircraft 121. Preferably, an aircraft maintains a constant angle of descent as it approaches the runway.

The path projection 125 illustrated in FIGS. 1, 3 and 4 is preferably inclined at the same angle as a preferred descent slope angle of descent for the aircraft 121. In FIG. 1, the path projection 125 is at an angle θ to horizontal. The path projection 125 extends from the aircraft 121 and intersects level (i.e., zero gradient) ground at the angle θ. In an ideal landing, the touchdown aim point 130 would stay at the same location on the runway 110 throughout the landing procedure. The path projection 125 is preferably extended at a constant angle θ during the landing operation.

According to one aspect of the invention, the path projection 125 is monitored in order to determine whether the intersection of the path projection 125 with the runway 110 is before or beyond the critical point 116. The intersection point is labeled as the touchdown aim point 130. It is significant when the touchdown aim point 130 is beyond the critical point 116 because if the aircraft 121 continues on that path projection 125 without adjustment, the aircraft 121 may not be able to stop safely before the runway end 120.

Monitoring may begin, for example, at the point 150. The point 150 can correspond to the location of the outer marker for a runway. Such a point can be at a distance of, for example, about 5 miles away from the runway 110. Monitoring may also begin once the path projection 125 intersects with the TDZ 115, and alerts may be provided to the pilot or crew of the aircraft 121 when certain conditions are met.

FIG. 4 is an isolated view of a portion of the runway 110. Several descent slopes $125_1$, $125_2$, $125_3$ and corresponding touchdown aim points $130_1$, $130_2$, $130_3$ are illustrated, corresponding to times $t_1$, $t_2$, $t_3$, respectively. As shown FIG. 4, at time $t_1$, if the current path projection $125_1$ is maintained, the aircraft 121 will land in front of the critical point 116. At time $t_2$, as a result of changing conditions, the path projection $125_2$ has moved towards the critical point 116, but remains in front of the critical point 116. At time $t_3$, the path projection $125_3$ intersects the runway at a touchdown aim point $130_3$ beyond the critical point 116. At this time, if the aircraft 121 continues on its current path projection $125_3$, there is a chance that the aircraft 121 may not have enough runway to land safely.

If the monitor 200 detects that the current path projection $125_i$ indicates that the aircraft 121 is likely to land beyond the critical point 116, the monitor 200 may issue an unsolicited alert. The alert may have the form of an audible message, such as a message stating the amount of runway the aircraft 121 will have available, after touchdown, to stop the aircraft 121. For example, the alert message can have the form "RUNWAY REMAINING 4000 FEET." The alert message should be short and should contain minimal information so that the pilot is not unnecessarily distracted.

As the aircraft 121 approaches the runway 110, the monitor 200 may periodically determine whether the touchdown aim point 130 passes over the critical point 116. In general, the monitor 200 issues an alert the first time the touchdown aim point 130 passes over the critical point 116. It is preferable that further alerts are not provided for each updating period, because the pilot is already made aware of the potentially dangerous situation. However, if after an alert is issued, and the touchdown aim point 130 again moves in front of the critical point 116 (i.e., runway overrun no longer likely), further alerts may be provided if the touchdown aim point 130 once again moves beyond the critical point 116. The monitor 200 may continue to monitor for runway distance remaining until touchdown.

The monitor 200 may monitor other aircraft conditions. For example, referring to FIG. 1, when the aircraft reaches point 150, the monitor 200 can determine whether the aircraft 121 is in a desired configuration for landing. The required configuration can be defined according to, for example, company regulations, such as would govern a commercial carrier. The required configuration may also be defined by standards recommended by the aircraft manufacturer, or by input by the pilot.

A configuration check can evaluate the following: whether aircraft landing gear is down; whether a required flap position is detected; whether a maximum tailwind component is exceeded; whether a maximum crosswind component is exceeded; whether the aircraft is above a maximum altitude; whether the aircraft is exceeding a maximum airspeed; and whether the aircraft is exceeding a maximum groundspeed. As discussed above, the monitor 200 may monitor for a touchdown aim point 130 that passes over the critical point 116. Each of the above factors or conditions can be selectively monitored and reported, depending on the usefulness of the information to the pilot. In general, the monitor 200 will not provide unsolicited alerts if there are no potential problems detected for the landing. Exemplary reporting options are discussed below.

The configuration check can be termed as a check of whether the aircraft is "in the slot." "In the slot" is a term indicating that an aircraft is operating within prescribed airspeed, gear position, flap position, power setting, and altitude parameters. A check of whether an aircraft is in the slot is usually made between the runway outer marker and some distance from the runway. Referring to FIG. 3, an aircraft in the slot can also indicate that the aircraft is within an angular range β about the runway 110 centerline 140. In general, when an aircraft is outside of the angular range β, the pilot is not warned. A pilot in this situation will likely be aware of the aircraft's location outside of the angular range β. The final approach course is an imaginary line extending back along a runway centerline from the approach end of the runway 110. The aircraft 121 can be considered to "track" the final approach course when the aircraft 121 is within a certain azimuth range β of the runway centerline 140 (see FIG. 3) The azimuth range β may be, for example, +/− five degrees. The final approach course may extend, for example, five miles before the runway 110 out to point 150. A specified lateral offset $l_1$ from the runway centerline 140 may also be used to define the final approach course. The offset $l_1$ can be, for example, about 250 feet.

At point 150, the aircraft 121 altitude may be too high to obtain tailwind and crosswind component values that are useful to evaluate the feasibility of a landing. Tailwind and crosswind component checks may therefore be delayed until the aircraft 121 is at a lower altitude.

Alert messages should be as brief and informative as possible. For example, if landing gear is not down in the configuration check, a message "NOT IN LANDING CONFIGURATION, GEAR" may be provided. Similarly, "NOT IN LANDING CONFIGURATION, FLAPS" can indicate flaps in the wrong position, or "NOT IN LANDING CONFIGURATION, AIRSPEED," may indicate an airspeed outside of recommended parameters, and "NOT IN LANDING CONDITION, ALTITUDE," can indicate an altitude outside of recommended parameters.

Referring to FIG. 1, at a point 160, the monitor 200 may enable monitoring of additional factors affecting the landing. For example, point 160 may correspond to a point where the aircraft 121 altitude is lower, in the range of, for example, 500 feet or less. At this time, tailwind and crosswind values may be more accurately determined as they affect landing on the runway 110. If a maximum tailwind or crosswind component value is exceeded, the monitor 200 may issue an alert informing the pilot of the condition. Monitoring for excessive tailwind or crosswind values may continue until the aircraft 121 is at a height of about 100 feet. At 100 feet, alerts may be addressed solely to whether sufficient runway remains for landing. In general, a tailwind or crosswind alert is given only once, as repetition may distract the pilot.

Crosswind alerts can indicate the crosswind component and direction. For example, a crosswind alert can have the form "RIGHT CROSSWIND 20 KNOTS." Similarly, a tailwind announcement can have the form "TAILWIND 10 KNOTS." As stated above, crosswind and tailwind announcements may be delayed until the aircraft 121 is at a lower altitude. In one preferred embodiment, tailwind and crosswind alerts are issued after the aircraft 121 descends below 300 feet, and cease when the aircraft descends below 100 feet.

The monitor 200 may monitor to determine whether the aircraft 121 will exceed a maximum touchdown speed or is currently exceeding a maximum airspeed. Monitoring for exceedance of maximum touchdown speed can begin at point 150, for example. In one embodiment, alerting for exceedance of maximum touchdown speed begins when the aircraft 121 descends to an altitude of about 300 feet. Other altitudes are also appropriate.

When the aircraft 121 reaches a threshold altitude, all alerts except for insufficient runway alerts may cease. The threshold altitude value may be, for example, 100 feet. At this time, alerts relating to crosswind, tailwind, and groundspeed, etc., may be extraneous and may distract the pilot.

The critical point 116 may be determined according to, for example, operator-recommended landing distances. The critical point 116 is determined as a function of runway length and runway distance required for the aircraft to land and stop safely. Required landing distance for an aircraft is dependent upon aircraft type, runway gradient, airport elevation, density altitude, established company parameters, and other factors determining the length of runway required for an aircraft to land safely. This information can be stored on computer-readable media, for example, and may be accessible by the monitor 200. The monitor 200 can also adjust the critical point 116 according to prevailing conditions. For example, the presence of a tailwind increases the distance required for an aircraft to land, thereby moving the critical point to the left in FIG. 1. The required landing distance may also be adjusted according to runway altitude, runway gradient, and air temperature.

In determining the critical point 116, the monitor 200 may account for aircraft flare occurring just before touchdown. The monitor 200 can account for flare in at least two ways. A first way to account for flare is to add an expected flare distance to the landing distance, and increase landing distance accordingly. This method results in the critical point 116 being moved to the left in FIG. 1. Alternatively, flare can be accounted for by virtually shifting the path projection 125 to the right in FIG. 1 by the expected flare distance.

The information provided to the pilot should be simple and as easily understood as possible. Therefore, distances are preferably rounded off to hundreds, or thousands of feet. For example, during the time when the aircraft is about to touch down, measurements of runway remaining are preferably rounded off to the nearest thousand foot increment. There are at least two ways of implementing this feature. A first way is to round the runway remaining figure down, so the pilot has a conservative estimate of runway remaining. Another is to round up or down, this method being less preferred. Another method is to time the sounding of an alert message so the threshold hundred or thousand foot increment message is accurate when received by the pilot. A method of timing messages is discussed in detail below with reference to FIG. 5.

Safety margins can also be programmed into the runway overrun monitor 200. For example, the pilot or other operator can program the monitor 200 to consistently underestimate runway remaining figures by a selected percentage or by a selected distance.

The pilot can end alerts from the monitor at any time. Alerts can be ended at the input 224. The input 224 can act as a "mute" button by a single press of a button. The pilot may take this action if he no longer plans on landing. The monitor 200 can be reactivated when, for example, the aircraft 121 arrives at its next visual path point.

The pilot or crew can also solicit information from the monitor 200 at any time. Solicited information can include any of the announcements discussed above. Solicited alerts can be requested, for example, at the input 224. For simplicity of the monitor 200, a single button can be used as a mute button as discussed above, and as a means for requesting unsolicited updates. For example, at a relatively far distance out (e.g., about 10 miles) from the TDZ 115, the pilot can double-press a button on the input 224 to request a runway identification, the distance to the TDZ 115, and ground speed. Such an announcement may have the form "RUNWAY TWO FOUR LEFT, NINE MILES TO TOUCHDOWN, 120 KNOTS OVER THE GROUND."

After reaching point 150, which may correspond to a location of the airport outer marker, the pilot may again solicit information by a double-press of a button on the input 224. This further information can include another runway identification, and groundspeed announcement.

The relatively high speeds at which the aircraft 121 travels renders the timeliness of alert messages of high importance. For example, an aircraft traveling at 150 knots traverses 250 feet per second. Therefore, any time-offset between a time when the message is accurate and when the message is actually received by the pilot can result in the pilot receiving erroneous information.

Figure 5:
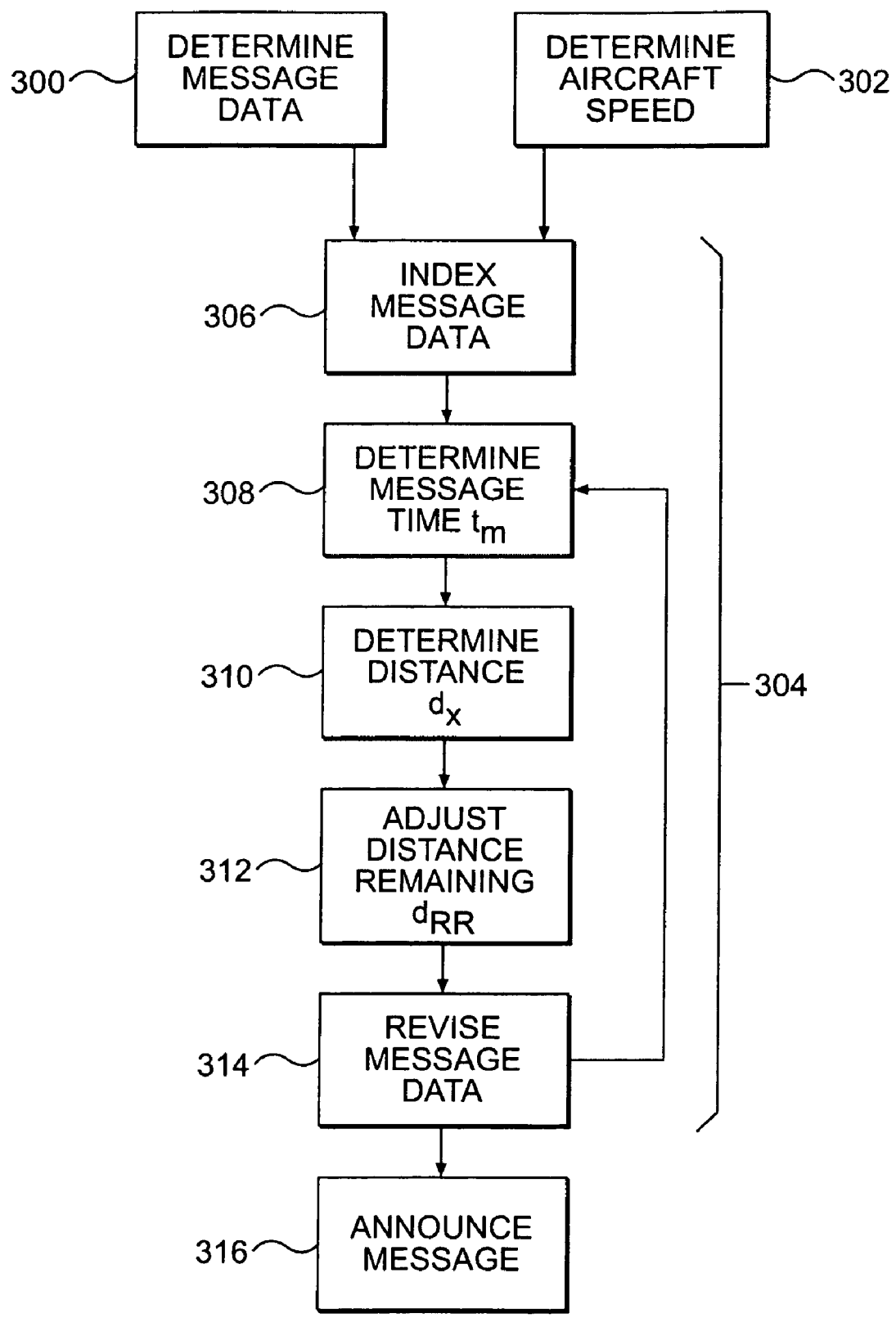
FIG. 5 illustrates a method of providing accurately timed alert messages.

FIG. 5 illustrates a method of ensuring that accurate alert messages are provided to a pilot or other operator. According to one aspect, the timing of alert messages is calculated so that the information is accurate when received by the pilot. For example, in one embodiment, an audible message is presented so that at the end of the message, the data conveyed in the message is accurate. The runway overrun monitor 200 disclosed in FIG. 2 can be programmed to announce messages in accordance with the method discussed below.

Referring to FIG. 5, message data is determined in step S300. The message data may correspond to any of the alert messages discussed above, and the message data determined in step S300 may be determined accordingly. For example, the message data can include a statement regarding runway remaining $d_{RR}$.

In step S302, a speed of the aircraft 121 is determined. The speed can be, for example, the groundspeed or airspeed of the aircraft 121. In a preferred embodiment, the groundspeed is determined. The message data and the aircraft speed can be determined concurrently, as shown in FIG. 5, or serially (not shown).

In step S304, the message is adjusted in order to compensate for factor such as the time required to announce the message, and for other factors. Step S304 can be determined according to steps S306–S314 below:

In step S306, the time at which the message data is accurate is indexed as $t_0$ for the piece of information in the message. The time $t_0$ can be indexed to account for time involved in calculating or processing information. For example, a time $t_0$ for a runway remaining message can be adjusted to account for the time required to read, for example, GPS instruments, and to calculate the runway remaining in the processor 201.

In step S308, a time $t_M$ required to announce an alert message is determined. For example, the message "RUNWAY REMAINING 4000 FEET" requires about 2.1 seconds to announce. If the pilot wants to hear the end of the message—i.e, the word "FEET"—when the aircraft has 4000 feet remaining, $t_M$ is equal to about 2.1 seconds. The time necessary to understand the massage and to react could also be considered when determining $t_M$. If the pilot wants to hear the word "4000" when the aircraft has 4000 feet remaining, $t_M$ is equal to about 1.8 seconds. The time required $t_M$ can therefore be calculated according to operator preferences. A default setting can be included in the monitor 200 so that $t_M$ is calculated according to the time required to announce the entire message.

In step S310, a distance value $d_x$ is determined. The distance value $d_x$ represents the distance the aircraft 121 travels during the time $t_M$ required to announce an alert message. Time $t_M$ is calculated according to the aircraft speed, and aircraft motion may be governed by the following equation:

$$d_x = v_x \times t_M \qquad \text{Equation 1}$$

In Equation 1, $d_x$ indicates a distance traveled in a direction aligned the runway 110 length while traveling with an x-component of velocity $v_x$.

In step 312, a distance value d contained in the message is adjusted by subtracting dx. If the relevant distance is runway remaining, the message data can include a statement regarding runway remaining $d_{RR}$. The adjusted runway remaining value $d_{RRA}$ is:

$$d_{RRA} = d_{RR} - d_x \qquad \text{Equation 2}$$

In step 314, the message data is revised according to the adjusted runway remaining value $d_{RRA}$.

In step 316, the alert is announced, including the adjusted runway remaining value $d_{RRA}$.

The method discussed above includes a feedback loop to address the situation in which the new distance $d_{RR}$ results in a new message length $t_M$. Activation of the feedback loop may be subject to a threshold change message length $\Delta t_M$ in message length $t_M$.

As an alternative to calculating a time $t_M$ for each distance message having a different distance value $d_{RR}$, a standard time $t_M$ can be assigned for all messages of this type. This approximation may be made because an announcement of "RUNWAY REMAINING 4000 FEET" has approximately the same $t_M$ as "RUNWAY REMAINING 500 FEET."

The method for providing timely message data described above can be applied during both solicited and unsolicited announcements.

The monitor 200 may also continue to provide situational awareness after the aircraft 121 has touched down. A method for providing situational awareness after touchdown is discussed below with reference to FIG. 6.

Closure rates between aircraft can be extremely fast. For example, at a closure rate of 1200 knots, an aircraft travels about one mile every ten seconds. In a collision alerting system (not shown), traffic alert announcements may be generated, for example, when traffic is within about 30 seconds of a point of closest approach between an aircraft and the traffic. Therefore, the length of time required to make a position announcement is a significant part of the time available to avoid the oncoming traffic. Further, the last item announced in an announcement may be the range between an aircraft and the traffic, which changes very quickly.

The closure rate is especially high when the traffic is an aircraft and the two aircraft are on a collision course. It is therefore critical in collision alerting systems that closure ranges are as accurate as possible when presented to the pilot. Accuracy of range announcements is particularly important because the pilot's perception of threat is based on the range between the aircraft and the traffic. Therefore, the closer oncoming traffic is, the more relevant it is to the pilot.

In accordance with a present embodiment of a traffic alerting system, traffic alert announcements are announced based on a predictive algorithm, similar to the runway remaining announcements discussed above. In other words, the range announcements from the traffic alerting system should be made so that the announced range is accurate at the end of the announcement, or, concurrently with the announcement of the range.

In one embodiment of a collision alerting system, a collision alerting system adjusts a calculated range between an aircraft and traffic using a predictive algorithm. The range is predicted in the following manner:

First, a detected traffic alerting range $R_d$ between the aircraft and traffic is determined. Next, a time $t_a$ required to announce the range $R_d$ is determined. The closing rate CR between the aircraft and the traffic is then determined. Then, the detected traffic alerting range $R_d$ is adjusted so that it will be accurate when the range is actually announced. The actual or adjusted range $R_a$ can be calculated according to the formula:

$$R_a = R_d - CR \times t_a \qquad \text{Equation 3}$$

The adjusted range $R_a$ is then announced.

As discussed above, a standard time $t_a$ may be used, rather than calculating the actual time required to make an announcement.

Figure 6:
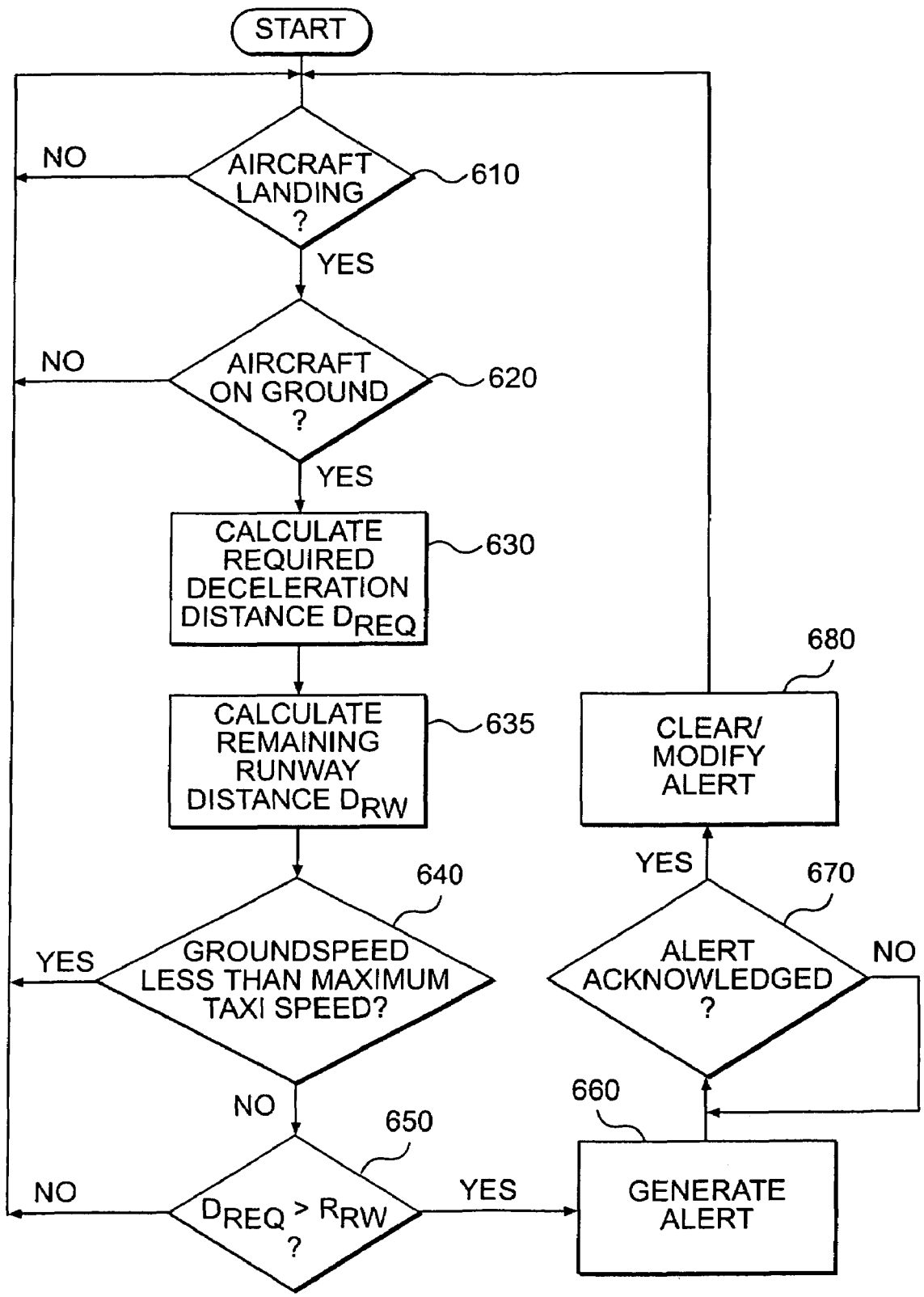
FIG. 6 illustrates a method of providing situational awareness after touchdown.

FIG. 6 illustrates a method for monitoring landing overrun after touchdown. In step 610 it is determined if the aircraft 121 is landing. This step can be performed by the processor 201 recognizing, for example, a landing gear position, or, by recognizing a decrease in altitude. The pilot can also manually input an indication that the aircraft 121 is landing. If the aircraft 121 is not landing, the method returns to step 610.

If the aircraft 121 is landing, in step 620 the runway overrun device 200 monitors to determine whether the aircraft 121 has touched down. This determination is made according to the sensor inputs available to the processor 201.

For example, referring to FIG. 2, the WOW sensor 210 output can be used to determine whether the aircraft 121 is airborne. Other devices and methods useful to determine whether the aircraft 121 is airborne include a comparison of the aircraft altitude with the altitude of the terrain at the aircraft's position. If the aircraft 121 has not yet touched down, the method returns to step 610.

If the aircraft 121 has reached the ground, the processor 201 calculates a required deceleration distance $D_{REQ}$ in step 630. The required deceleration distance $D_{REQ}$ is the distance that will be traveled by the aircraft 121 in decelerating from the current groundspeed to a desired groundspeed.

The desired groundspeed can be, for example, zero, or some speed that allows the aircraft 121 to turn at the runway end, such as a maximum taxi speed. The required deceleration distance is based on runway remaining, and is calculated using the values of groundspeed upon landing. The time to decelerate to the desired groundspeed may be determined using the deceleration rate. The deceleration rate can be measured directly, using, for example, an accelerometer, or calculated by determining the time derivative of the measured groundspeed. Aircraft deceleration can be determined as a deceleration function by extrapolating a curve from three or more position data points.

In step 635, the runway distance remaining $D_{RW}$ is determined. The remaining runway distance $D_{RW}$ is calculated by comparing the aircraft position with the data from the source 202 of runway data.

In step 640, it is determined whether the groundspeed of the aircraft is less than a maximum taxi speed. If the aircraft 121 is traveling at a speed below the maximum value, such as, for example, 10 knots, it is likely that the aircraft 121 is taxiing. If so, the method ends and the runway overrun monitor 200 ceases to monitor for a runway overrun.

In step 650, it is determined whether the required deceleration distance $D_{REQ}$ is greater than the remaining runway distance $D_{RW}$. If not, the method returns to step 610. If the required deceleration distance $D_{REQ}$ is greater than the remaining runway distance $D_{RW}$, an alert is generated in step 660. The warning can comprise, for example, an audio message broadcast by the audio indicator 220, a visual message displayed by the visual indicator 222, or a combination audio and visual message. For example, the audio message can contain an indication of the calculated runway distance remaining $D_{RW}$ soon after touchdown and aircraft groundspeed. The visual indicator 222 can display similar information, including a running display of the remaining runway distance $D_{RW}$, and, for example, a flashing warning indicator. Broadcasts of the remaining runway distance $D_{RW}$ and the aircraft's groundspeed can be updated periodically.

According to the above method, the pilot receives a warning when the remaining runway distance $D_{RW}$ is insufficient to safely decelerate the aircraft 121 at the current deceleration function. The information from the runway overrun monitor allows the pilot to increase the rate of deceleration, such as by increasing the braking force, or by increasing reverse engine thrust, if available.

As an alternative to step 650, the processor 201 can determine whether the aircraft 121 has exceeded a predetermined groundspeed in conjunction with having less than a specified remaining runway distance $D_{RW}$. For example, if the aircraft 121 is traveling at a rate of 75 knots over ground, and 2,000 feet of runway remain, a warning can be generated stating the groundspeed and remaining runway.

The trigger for generating an alert can be reference to a table specifying, for example, that at a remaining runway distance of 2,000 feet, a warning will be generated when aircraft groundspeed exceeds 70 knots. A table of remaining runway distance $D_{RW}$ versus groundspeed can be manually entered by an operator, or preprogrammed in the processor 201. The above threshold values for remaining runway distance $D_{RW}$ and groundspeed can be adjusted according to airport and runway conditions and aircraft performance data.

As an alternative to or in addition to the above embodiment, the required deceleration for a safe stop can be compared to the aircraft's actual deceleration. An alert may be provided if the aircraft's deceleration is not sufficient.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A method of providing situational awareness during landing of an aircraft on a runway, comprising:
    determining whether a path projection of the aircraft intersects the runway in front of or beyond a critical point, where the critical point is a function of aircraft type and is that point at which, if the aircraft lands beyond the critical point, there is a likelihood of the aircraft overrunning the runway during landing; and
    providing an alert if the path projection intersects the runway beyond the critical point.

2. The method of claim 1, wherein determining whether a path projection of the aircraft intersects the runway in front of or beyond the critical point comprises:
    repeatedly making said determination during the aircraft's approach to the runway.

3. The method of claim 1 which further includes:
    determining the critical point.

4. The method of claim 3, wherein determining a critical point on the runway comprises:
    determining a required landing distance for the aircraft.

5. The method of claim 4, wherein determining a required landing distance for the aircraft comprises:
    adjusting a landing distance value according to one or more of the following factors: tailwind component, runway gradient, runway altitude, and temperature.

6. The method of claim 4, wherein determining whether a path projection of the aircraft intersects the runway in front of or beyond the critical point comprises;
    extending the path projection from the aircraft at a descent slope angle.

7. The method of claim 6, wherein the descent slope angle is constant during approach.

8. The method of claim 1, wherein providing an alert comprises:
    announcing a runway distance remaining.

9. The method of claim 1, comprising:
    determining whether the aircraft exceeds a maximum groundspeed; and providing an alert if the aircraft exceeds the maximum groundspeed.

10. The method of claim 1, comprising:

determining whether a maximum tailwind component is exceeded; and providing an alert if the maximum tailwind component is exceeded.

11. The method of claim 1, comprising:

determining whether a maximum crosswind component is exceeded; and providing an alert if the maximum crosswind component is exceeded.

* * * * *